Patented Feb. 25, 1936

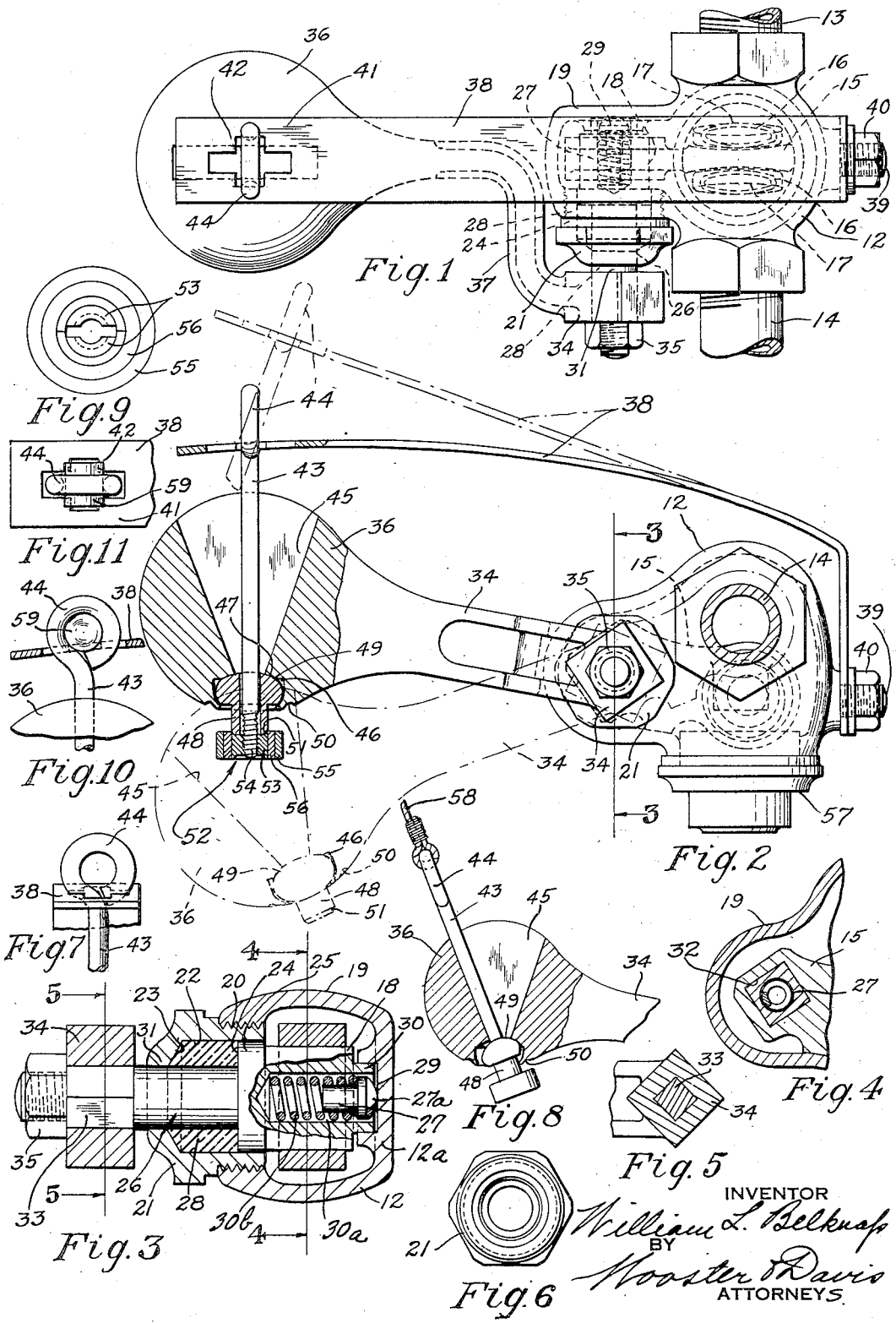

2,031,630

UNITED STATES PATENT OFFICE 2,031,630

HEAT RESPONSIVE VALVE

William L. Belknap, Stratford, Conn.

Application February 19, 1934, Serial No. 711,975

4 Claims. (Cl. 137—162)

This invention relates to a valve and more particularly to a shut-off valve for a gas or liquid fuel supply pipe in a basement or other suitable location for automatically cutting off the supply of fuel in case of fire.

It is an object of the invention to provide a valve construction which will be fluid tight but which will not become stuck or inoperative after being held in the open position for a long time without operation, and in which wear or shrinkage of the packing is automatically compensated for so it is always in condition to prevent leakage.

Another object of the invention is to provide an improved and simple means for normally retaining the valve in open position, but which will operate positively in case of a fire to close the valve and cut off the fuel supply and thus greatly decrease the fire hazard and danger to firemen in case of fire.

With the foregoing and other objects in view the invention consists in certain novel features of construction, combination and arrangement of parts as will be more fully disclosed in connection with the accompanying drawing, it being, however, understood that various changes and modifications may be employed within the scope of the invention.

In this drawing:

Fig. 1 is a top plan view of the valve installed in a fuel supply pipe and showing the parts with the valve in the open position;

Fig. 2 is a side elevation thereof, the parts being broken away to more clearly show the construction;

Fig. 3 is a transverse section through the valve spindle on an enlarged scale, the section being substantially on the line 3—3 of Fig. 2;

Fig. 4 is a detail section substantially on the line 4—4 of Fig. 3;

Fig. 5 is a detail section substantially on the line 5—5 of Fig. 3;

Fig. 6 is an end view of the closure or nut forming a bearing for the valve spindle and carrying the sealing bushing;

Fig. 7 is a detail end view of the outer end of the supporting spring arm showing the link in place;

Fig. 8 is a detail sectional view illustrating how the device may be used with a fusible link system comprising a series of wires or similar connecting means;

Fig. 9 is an enlarged end view of a desirable construction of a fusible element to be used with this device;

Fig. 10 is a section through the end of the spring arm showing how a fusible element may be used at the upper end of the link; and Fig. 11 is a top plan view thereof.

The valve shown comprises a casing 12 with means for connecting a supply and delivery pipe thereto. In the present instance the pipe 13 may be considered the supply pipe leading from a gas main in the street or from an oil storage tank, and 14 is a delivery pipe leading to the gas delivery system of the building or the furnace. This valve is so constructed that if, due to the location of the supply pipe, it is better that the weighted arm be on the other side, the valve may be reversed, if desired. The passage through the valve casing between the pipes 13 and 14 may be closed by any suitable valve construction as this may vary. The details of this valve are not illustrated beyond indicating that it may comprise a swinging arm 15 carrying valve elements 16 movable to and from a position between valve seats 17 to control the passage.

The arm 15 is mounted on a spindle 18 mounted for turning movements in the casing. The casing is provided with an extension 19 at one side, one side wall of which has an opening 20 therein. This opening is closed by a closure or nut 21 which may be secured to the casing by any suitable means, but preferably the opening 20 is threaded and the closure 21 threaded to correspond as indicated. This closure 21 has a socket 22 opening from its inner end with the bottom or inner end of this socket tapered as indicated at 23. Fitting in this socket and about the valve spindle 26 is a packing 28. This may be of any suitable material but is preferably a composition including graphite so as to provide lubrication on the valve spindle. It is sufficiently soft and yieldable to snugly fit the socket 22 and to be pressed against the spindle by the construction presently to be described.

The valve spindle has a cylindrical portion 26 having a good bearing or running fit in the opening in the outer end of the closure 21, and an enlargement or flange 25 having a bearing or running fit in outer end portion of socket 22. This flange 25 forms a shoulder 24 pressing against the end of the packing 28. Inwardly of the flange 25 the spindle has a non-circular portion 18, preferably square, to extend into a similarly shaped opening in the valve arm 15 so that this arm turns with the spindle. The inner end of this spindle is circular as indicated at 30 and extends into and has a good bearing or running fit in a socket 29 in the opposite wall 12a of the casing 12. It will thus be seen the spindle has three widely spaced bearings which effectively hold it in proper alignment and prevent its being cramped out of position or binding by weight of the lever 34 which is mounted on a non-circular (preferably square) portion 33 of the spindle so operation of the lever will operate the spindle to operate the valve. The lever may be secured by any suitable means such as a nut 35 threaded on the end of the spindle.

Extending from the inner end of the spindle is a socket 30 in which is a resilient element such as a compression spring 30b resting at its inner end against the end of the socket and at its outer end embracing a bearing plug 27 and engaging a shoulder thereon formed by the under side of a rounded head 27a. The rounded outer wall of this head rests on the bottom of socket 29 and makes an easy turning bearing thereon. It will be evident that pressure of this spring forces the shoulder 24 against the end of packing 28 and by reaction of this packing on the inclined surface 23 forces it in close contact with the various surfaces of the socket and spindle making a very effective seal to prevent leakage of fluid from the casing. As the pressure of the spring is practically constant the pressure of the packing on the spindle is substantially constant so that the spindle will not become stuck but has a substantially constant resistance to turning at all times. Also, as the valve spindle has the three widely spaced bearings as above described it cannot cramp out of place to deform the packing or become bound or cramped in it.

The valve arm 15 is mounted on the inner enlarged portion of the spindle by any suitable means. In the present instance, the inner end of the spindle is non-circular, in the present case substantially square, to extend into a similarly shaped opening 32 in the arm. Also, any suitable means may be provided on the projecting end of the spindle for turning it to operate the valve. In the present construction this projecting portion is provided with a non-circular portion 33, shown as substantially square to extend into a similarly shaped opening in the lever 34. The lever may be secured by any suitable means such as a clamp nut 35 threaded to the end of the spindle.

In the present instance this valve is shown as used with heat responsive means which will yield or release in case of fire to permit the valve to close. For this purpose the lever 34 is weighted so as to tend to shift the valve to closed position. Various means of weighting may be employed but I prefer that substantially as shown in which the lever 34 is provided with an enlargement 36 forming a weight. The lever is also curved laterally to provide an offset 37 so that the weight 36 is brought substantially on the center line of the valve body. The weight and lever can then be effectively supported in the elevated position to hold the valve open by very simple means.

A very effective support for supporting the lever in elevated position comprises a flat spring bar 38 secured at one end to the valve casing by any suitable means such as a threaded stud 39 and a clamping nut 40. This spring bar extends over the weighted lever 36 and is provided with a cross shaped opening, one slot 41 of which is longer than the other slot 42. The lever is supported from this arm by a link member 43 which may comprise a rod having a head 44 in the form of an eye at its upper end. This head is of a width to pass through the slot 41 of the opening but is of greater width than the length of the slot 42 so that the head may be passed through the slot 41 but when turned a quarter turn will be held in the slot 42 and be supported by the end walls thereof. The weighted lever 34 is provided with a tapered opening 45 having the larger end opening through the top wall of the lever and its lower end opening into a counterbore 46 having a spherical surface 47 on the shoulder formed thereby. Within this counterbore is a headed bushing 48, the upper surface 49 of which is rounded or substantially spherical so as to rock on the surface 47. The head may be secured in the counterbore by forcing in the rim at the outer end thereof by a suitable punch as indicated at 50 to form an annular lip over the head and thus retain it therein but permit it to rock freely. The lower portion of this sleeve projects below the lever to form a shank as indicated at 48 having a tapered end 51 to seat in a fusible element indicated at 52. This element comprises a brass core 53 split into two pieces and threaded to receive the threaded end 54 of the rod 43. This fusible element also includes a brass outer ring 55 to strengthen and prevent spreading of the fusible metal sleeve 56 mounted between the core 53 and the brass outer ring 55. The element 56 is made of an alloy which is easily fusible. It is well known in the trade, the composition of which varies depending on the temperature at which it is desired that it soften or fuse to release the elements held by it. In the present case as this metal softens under heat the tapered end wall 51 of the sleeve 48 spreads the elements of the core 53 apart releasing the threaded end 54 of the rod 43. This releases the lever 34 and permits it to drop to the dot and dash line position under the action of the weight and thus to close the valve 16. This fusible element is described and claimed per se in a separate application.

If at any time it is desired to close the valve without releasing the fusible element all that is necessary is to turn the head 44 a quarter of a revolution so that it may pass through the longer part or slot 41 of the opening in the spring arm 38, it being understood that the valve is so arranged that when the lever is in the upper position the valve is open and when in the lower position the valve is closed. The element indicated at 57 is a threaded enclosure tightly sealing an opening in the bottom wall of the valve body to give access to the valve element 16.

It may sometimes be desirable to use this valve with a system of fusible elements located at some distance from the valve. Thus, there may be a wire strung about the room in which the valve is located with fusible links located at different points, and then this wire indicated at 58 may be connected to the link 43 so that should any fusible element in the system fail the valve lever will be allowed to drop to close the valve. The tapered opening 45 permits the link 43 to rock to various positions as indicated in Fig. 8, and also the extension 48 keeps the fusible element 53 spaced below the lever so that it cannot become frozen thereto. This arrangement insures that the device will be installed so that it will always operate in case of fire. Thus, should it not be convenient to run the wire 58 vertically from the valve lever no harm will be done if it extends at an angle and rocks the link 43 laterally as indicated in Fig. 8 because even in this position there is nothing to bind or clamp either this link 43 or the fusible element 52, and therefore it will always release to permit the valve lever to drop in case one of the fusible elements yielded.

It may sometimes be desirable to have a fusible element at the top of the link 43 as well as at the bottom. Thus as shown in Figs. 10 and 11 a round slug of easily fusible metal 59 may be passed through the eye 44 and seat in the cross slot 42 of the opening in the arm 38 while the eye 44 is turned to align with the slot 41 of this opening. The slug 59 is of a diameter greater than the width of the slot 42 so as to seat in it as shown in Fig. 10. If this element fuses the eye 44 merely passes through the portion 41 of the opening and releases the weight 36 of the lever 34 to permit the valve to close.

It will be evident this construction and arrangement provides a simple compact construction which can be easily installed without the use of a complicated layout and forms an arrangement which can be relied upon to close the valve in case of fire. It also can be easily reset by a very simple operation. The valve itself is of extremely simple construction and is effectively sealed against leakage.

Having thus set forth the nature of my invention, what I claim is:

1. In combination, a valve casing, a valve therein, a valve operating spindle mounted to turn in the casing, an operating lever secured to said spindle and including an enlargement forming a weight tending to close the valve, a spring arm secured to the casing and extending over the lever, a link depending from the arm to support the weighted lever in elevated position with the valve open, and a fusible element on said link to release the lever in case of fire.

2. In combination, a valve casing, a valve therein, a valve operating spindle mounted to turn in the casing, a weighted lever secured to said spindle and tending to close the valve, a spring arm secured to the casing and extending over the lever, said arm having an opening consisting of cross slots of different lengths, and a fusible link connection between the arm and the lever including a head of a width less than the length of one of said slots and greater than the length of the other slot.

3. In combination, a valve casing, a valve therein, a valve operating spindle mounted to turn in the casing, an operating lever secured to said spindle and including an enlargement forming a weight tending to close the valve, said enlargement having an upright tapered opening therein largest at the top and including a counterbore at its lower end, a bushing mounted for rocking movement in the counterbore and having an opening therethrough, a link passing through said tapered opening for supporting the lever in elevated position including a rod portion extending through said opening in the bushing and carrying an easily fusible element engaging the lower end of the bushing, and means for supporting the link.

4. In combination, a valve casing, a valve therein, a valve operating spindle mounted to turn in the casing, an operating lever secured to said spindle and including an enlargement forming a weight tending to close the valve, said enlargement having an upright tapered opening therein largest at the top and including a counterbore at its lower end, a bushing mounted for rocking movement in the counterbore and having an opening therethrough, a spring arm secured to the casing and extending over the lever and having an opening therein, a link passing through said tapered opening and having a head passing through the opening in the spring arm and supported by said arm and also having a rod portion extending through said bushing, and a fusible element mounted on the rod and engaging the lower end of the bushing to support the lever in elevated position.

WILLIAM L. BELKNAP.